United States Patent
Mizuta et al.

(10) Patent No.: US 6,498,206 B2
(45) Date of Patent: Dec. 24, 2002

(54) IMPACT MODIFIER HAVING IMPROVED BLOCKING RESISTANCE

(75) Inventors: Tosio Mizuta, Takasago (JP); Akio Sato, Kobe (JP); Tomomichi Hashimoto, Takasago (JP); Mitsuo Kakutani, Takasago (JP); Akira Takaki, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/917,762

(22) Filed: Jul. 31, 2001

(65) Prior Publication Data

US 2002/0013410 A1 Jan. 31, 2002

(30) Foreign Application Priority Data

Apr. 4, 2000 (JP) .................................. 2000-237254

(51) Int. Cl.[7] .............................. C08K 5/09; C08K 5/54; C08L 51/04
(52) U.S. Cl. ...................... 524/300; 524/267; 524/268; 524/301; 524/394; 524/504; 524/506; 524/515; 524/523; 525/63; 525/64; 525/70; 525/78; 525/100; 525/101; 525/326.1
(58) Field of Search ................ 524/267, 268, 524/504, 506, 515, 523, 300, 301, 394; 525/63, 64, 70, 78, 100, 101, 326.1

(56) References Cited

U.S. PATENT DOCUMENTS

| | | | | |
|---|---|---|---|---|
| 5,514,122 A | * | 5/1996 | Morris et al. | 428/343 |
| 6,306,961 B1 | * | 10/2001 | Tone et al. | 524/504 |
| 6,400,492 B1 | * | 6/2002 | Morita et al. | 204/477 |
| 2001/0005567 A1 | * | 6/2001 | Harada et al. | 430/32 |
| 2002/0042456 A1 | * | 4/2002 | Kobayashi et al. | 523/204 |

OTHER PUBLICATIONS

Machine Translation of JP 2001–131429 from JPO web-site, Mizuta et al. May, 2001.*

* cited by examiner

*Primary Examiner*—Robert Dawson
*Assistant Examiner*—Jeffrey B. Robertson
(74) *Attorney, Agent, or Firm*—Armstrong Westerman & Hattori, LLP

(57) ABSTRACT

A resin composition suitable as an impact modifier for thermoplastic resins, which has an excellent blocking resistance improved without lowering the effect of improving the impact resistance and which comprises 100 parts by weight of a graft copolymer containing a hollow rubber component and at least two additives selected from the group consisting of 0.1 to 10 parts by weight of a higher fatter acid soap, 0.1 to 10 parts by weight of a crosslinked polymer of 0.1 to 100% by weight of a crosslinking monomer and 0 to 99.9% by weight of a vinyl monomer and 0.001 to 5 parts by weight of a silicone oil.

3 Claims, No Drawings

IMPACT MODIFIER HAVING IMPROVED BLOCKING RESISTANCE

BACKGROUND OF THE INVENTION

The present invention relates to a powdery resin useful as an impact modifier for thermoplastic resins, and more particularly to an impact modifier having an improved blocking resistance.

Various proposals have been made to improve the impact resistance of thermoplastic resins. Crazing and shearing yield play an important part in the improvement of impact resistance, and stress concentration in molded articles is inevitable for the generation thereof. For this purpose, graft copolymers containing a rubber component have been popularly incorporated into thermoplastic resins to improve the impact resistance. It is also known to perforate rubber particles ("Impact Resistance of Plastics" by Ikuo Narisawa, pages 131 and 155, published by Siguma Shuppan). Further, in recent years, it has been investigated to improve the impact resistance of thermoplastic resins by using graft copolymers having a hollow rubber component.

For example, JP-A-10-310714 proposes a process of the synthesis of a hollow rubber-containing graft copolymer useful for improving the impact resistance of thermoplastic resins, wherein the graft copolymer is prepared utilizing a technique of synthesis of hollow particles. However, the graft copolymer prepared by this process is poor in powder characteristics and in particular has a blocking problem that the powdery polymer aggregates to a mass during storage, transfer or transportation.

In order to solve this problem, JP-A-11-315587 proposes adding a crosslinked polymer of 0.1 to 100% by weight of a crosslinking monomer and 0 to 99.9% by weight of a vinyl monomer to the graft copolymer. The blocking resistance of the graft copolymer is improved by the addition of this crosslinked polymer.

It is an object of the present invention to further improve the blocking resistance of the hollow rubber-containing graft copolymer.

A further object of the present invention is to provide a graft copolymer which is prepared by graft polymerization of a vinyl monomer onto hollow rubber particles and which can be suitably used as an impact modifier for thermoplastic resins without causing blocking during storage, transfer or transportation.

These and other objects of the present invention will become apparent from the description hereinafter.

SUMMARY OF THE INVENTION

It has now been found that the blocking resistance of the hollow rubber-containing graft copolymer can be remarkably improved by incorporating the crosslinked polymer of 0.1 to 100% by weight of a crosslinking monomer and 0 to 99.9% by weight of a vinyl monomer into the graft copolymer together with at least one of a higher fatty acid soap and a silicone oil, or by incorporating the higher fatty acid soap and the silicone oil into the graft copolymer.

Thus, in accordance with the present invention, there is provided an impact modifier having an improved blocking resistance which comprises (A) a graft copolymer prepared by polymerization of a vinyl monomer in the presence of hollow rubber particles, and at least two additives selected from the group consisting of (B) 0.1 to 10 parts of a higher fatty acid soap, (C) 0.1 to 10 parts of a crosslinked polymer of 0.1 to 100% by weight of a crosslinking monomer and 0 to 99.9% by weight of a vinyl monomer and (D) 0.001 to 5 parts of a silicone oil, the parts of (B), (C) and (D) being parts by weight per 100 parts by weight of the graft copolymer (A).

The higher fatty acid soap used in the present invention is anionic surface active agents of carboxylic acid type having a $C_7$ to $C_{25}$ alkyl group, preferably a $C_{10}$ to $C_{20}$ alkyl group.

DETAILED DESCRIPTION

The hollow rubber particle is a rubber particle having rubber component-non-filled part or parts therein, namely a rubber particle having hollow part or parts therein, unlike a conventional rubber particle the whole of which is formed by a rubber component. A typical hollow particle is hollow in the core part of the particle. The hollow rubber particles can be prepared by various known methods as disclosed in Takaaki Sugimura et al, Application of Synthetic Latex, page 285, published by Kobunshi Kankokai, Japan, e.g., (a) a method wherein a W/O/W emulsion is formed (O: lipophilic, W: hydrophilic) and a monomer of the O-layer is polymerized, (b) a method wherein core-shell polymer particles having a swellable core is swollen at a temperature of not less than Tg (glass transition temperature) of the shell layer, thereby forming a hollow part, (c) a method wherein polymers having different solubility parameters are produced by a two stage polymerization, (d) a method wherein an oily material and a monomer mixture containing a crosslinking monomer and a hydrophilic monomer are dispersed into water to form an O/W emulsion, the monomer mixture is polymerized and the oily material is removed from the produced polymer particles, and (e) a method utilizing a phenomenon that carboxylic acid units copolymerized into a rubber particle move in the particle under acidic or alkaline conditions.

The rubber particles used in the present invention which have a hollow part in the state of a latex can be prepared by any methods without particular restriction. For example, the hollow rubber particles can be prepared by emulsion polymerization of a monomer such as a diene monomer for forming a rubber in the presence of a swellable seed polymer and a swelling material which are used for forming a hollow part in a resulting rubber particle.

Examples of the seed polymer are, for instance, a rubber such as diene rubber, acrylic rubber, silicone rubber or olefin rubber; a semi-hard polymer such as butyl acrylate-styrene copolymer or ethyl acrylate-styrene copolymer; and a hard polymer such as styrene-methyl methacrylate. These seed polymers may be those prepared in the presence of a chain transfer agent such as t-dodecylmercaptan or n-dodecylmercaptan in order to decrease the molecular weight thereof.

The rubber which substantially constitutes the hollow particles is preferably a rubbery elastomer having a Tg of not more than 0° C., more preferably a much lower Tg. The rubber includes, for instance, a diene rubber, an acrylic rubber, a silicone rubber and an olefin rubber. Examples of the diene rubber are, for instance, butadiene rubber, styrene-butadiene rubber, acrylonitrile-butadiene rubber, and the like. Examples of the acrylic rubber are, for instance, butyl acrylate rubber, butadiene-butyl acrylate rubber, 2-ethylhexyl acrylate-butyl acrylate rubber, and the like. A typical example of the silicone rubber is polydimethylsiloxane rubber. Examples of the olefin rubber are, for instance, ethylene-propylene rubber, ethylene-propylene-diene rubber, and the like.

In the polymerization for preparing the rubber, a crosslinking monomer can be used as a comonomer. The crosslinking monomer serves to prevent the rubber particles from breaking to pieces when a thermoplastic resin incorporated with an impact modifier is thermally molded. If the amount of the crosslinking monomer is too large, the rubber particles do not break at the time of molding, but the impact strength of the molded article is not greatly improved since a void is hard to extend when the molded article receive an impact (under stress).

Examples of the crosslinking monomer are, for instance, allyl methacrylate, divinyl benzene, diallyl phthalate, polyethylene glycol dimethacrylate, 1,3-butylene glycol dimethacrylate, ethylene glycol dimethacrylate, and other known crosslinking monomers.

The preparation of the hollow rubber particles is not limited to a particular method, but emulsion polymerization method is preferred since the preparation can be efficiently conducted.

The hollow rubber particles may be directly used in the preparation of a graft copolymer by graft polymerization of a vinyl monomer onto the rubber particles, or may be subjected to a particle size enhancement treatment in a known manner, wherein the rubber particles are agglomerated by the use of an acid or a salt to enhance the particle size of the rubber particles, for the purpose of obtaining a graft copolymer having a large particle size. The cavity (hollow part) of the rubber particles which are hollow in the state of a latex can be confirmed by TEM observation wherein a rubber latex is embedded in an epoxy resin and stained with ruthenium tetraoxide. Also, the percentage of cavity can be determined by exactly measuring the particle size of a rubber latex with a particle size analyzer such as Microtrac UPA (product of LEED & NORTHRUP INSTRUMENTS) and measuring the light scattering intensity of the same latex, followed by calculation. From the viewpoint of the effect of improving the impact resistance of molded articles, the cavity percentage of the hollow rubber particles in the latex is from 3 to 90% by volume, preferably from 10 to 60% by volume. If the cavity percentage is more than 90% by volume, the rubber particles may break at the time of molding a thermoplastic resin, so the impact resistance is not stably improved. If the cavity percentage is less than 3% by volume, the impact resistance-improving effect is small since a void is hard to generate and extend in the rubber when the molded article receives an impact.

It is preferable in exhibiting the maximum effect of improving the impact resistance of molded articles of thermoplastic resins that the particle size of the graft copolymer used in the present invention is within the range of 0.05 to 2.0 $\mu$m, though the optimum value varies depending on the kind of the thermoplastic resins. If the particle size is outside the above range, the impact resistance-improving effect becomes small.

The graft copolymer is prepared by polymerizing 10 to 70 parts by weight, preferably 15 to 40 parts by weight, of a vinyl monomer in the presence of 30 to 90 parts by weight, preferably 60 to 85 parts by weight, of the hollow rubber particles, the total of the monomer and the rubber particles being 100 parts by weight. If the amount of the rubber particles is less than 30 parts by weight, the effect of improving the impact resistance is small. If the amount of the rubber particles is more than 90 parts by weight, the effect of improving the impact resistance of molded articles tends to become small since the graft copolymer particles collapse at the time of the molding.

Examples of the vinyl monomer used in the preparation of the graft copolymer are, for instance, a (meth)acrylic ester, preferably an alkyl (meth)acrylate such as methyl methacrylate, ethyl methacrylate, butyl methacrylate, 2-ethylhexyl methacrylate, methyl acrylate, ethyl acrylate, butyl acrylate or 2-ethylhexyl acrylate; an aromatic vinyl compound such as styrene, $\alpha$-methylstyrene or chlorostyrene; a vinyl cyanide compound such as acrylonitrile or methacrylonitrile; vinyl chloride; and the like.

A crosslinked polymer obtained by polymerization of 0.1 to 100% by weight of a crosslinking monomer and 0 to 99.9% by weight of a vinyl monomer is added to the graft copolymer in order to improve the blocking resistance of the graft copolymer. From the viewpoint of obtaining a larger effect of improving the blocking resistance, it is preferable that the average particle size of the crosslinked polymer is from 50 to 500 nm, especially 100 to 300 nm, more especially 110 to 250 nm.

The crosslinking monomer is a polyfunctional monomer having at least two polymerizable unsaturated bonds and forms a crosslinked structure. As the crosslinking monomer can be used those exemplified above with respect to the preparation of the rubber. Examples of the vinyl monomer used for the preparation of the crosslinked polymer are the same as those exemplified above with respect to the preparation of the graft copolymer. Vinyl monomers a homopolymer of which has a Tg of not less than 20° C. are particularly preferred. Examples of such vinyl monomers are, for instance, methyl methacrylate, butyl methacrylate, an aromatic vinyl monomer such as styrene or $\alpha$-methylstyrene, a vinyl cyanide compound such as acrylonitrile or methacrylonitrile. The vinyl monomers may be used alone or in admixture thereof.

The crosslinked polymer comprises 0.1 to 100% by weight of a crosslinking monomer and 99.9 to 0% by weight of a vinyl monomer. From the viewpoint that a good transparency is obtained when incorporated into vinyl chloride resins, the crosslinked polymer is preferably prepared from a monomer mixture of 0.1 to 25% by weight of a crosslinking monomer, 30 to 60% by weight of methyl methacrylate, 65 to 35% by weight of an aromatic vinyl monomer and 0 to 30% by weight of other vinyl monomers.

The crosslinked polymer can be prepared by a usual emulsion polymerization method with the use of a radical polymerization initiator and optionally a chain transfer agent.

In the preparation of the graft copolymer and the crosslinked polymer are used a radical polymerization initiator and optionally a chain transfer agent. Those used in usual radical polymerization can be used in the present invention.

Examples of the radical polymerization initiator are, for instance, an organic peroxide such as cumene hydroperoxide, t-butyl peroxide, benzoyl peroxide, t-butylperoxyisopropyl carbonate, di-t-butyl peroxide, t-butyl laurate, lauroyl peroxide, disuccinic acid peroxide, cyclohexanone peroxide or acetylacetone peroxide, an inorganic peroxide such as potassium persulfate or ammoniu persulfate, an azo compound such as 2,2'-azobisisobutyronitrile or 2,2'-azobis-2,4-dimethylvaleronitrile, and the like. Organic peroxides and inorganic peroxides are preferred from the viewpoint of high reactivity. Organic peroxides or inorganic peroxides can be used in combination with a reducing agent, e.g., a mixture of ferrous sulfate/glucose/sodium pyrophosphate, ferrous sulfate/dextrose/sodium pyrophosphate or ferrous sulfate/ sodium formaldehyde sulfoxylate/ethylenediaminetetraacetic acid salt. The combination use with a reducing agent is preferable since the polymerization temperature can be lowdered.

The amount of the radical polymerization initiator is usually from 0.005 to 10 parts by weight per 100 parts by weight of the total of monomers used. If the amount of the initiator is small, the rate of polymerization reaction becomes slow and accordingly the productivity tends to lower. If the amount of the initiator is too large, the molecular weight of the produced polymer is lowered and the impact resistance or the powder characteristics tend to lower.

Examples of the chain transfer agent are, for instance, t-dodecylmercaptan, n-octylmercaptan, n-tetradecylmercaptan, n-hexylmercaptan and the like. The chain transfer agent is optionally used. In case of using the chain transfer agent, the amount is from 0.001 to 5 parts by weight per 100 parts by weight of the total of monomers used.

In order to efficiently improve the blocking resistance of the graft copolymer, the crosslinked polymer is incorporated into the graft copolymer in a manner such that after coagulating a latex of the graft copolymer to form a slurry having a solid content of about 5 to about 40% by weight, to the slurry is added a latex of the crosslinked polymer or a slurry having a solid content of about 5 to about 40% by weight formed by coagulating the latex of the crosslinked polymer, followed by recovery of a resin powder from the resulting mixture.

The amount of the crosslinked polymer incorporated into the graft copolymer is from 0.1 to 10 parts by weight per 100 parts by weight of the graft copolymer from the viewpoint of balance of impact resistance and blocking resistance. If the amount of the crosslinked polymer is too small, the effect of improving the blocking resistance tends to lower. If the amount is too large, the impact resistance tends to lower.

Examples of the higher fatty acid soap are, for instance, lauric acid soap, myristic acid soap, palmitic acid soap, stearic acid soap and the like. The higher fatty acid soaps may be used alone or in admixture thereof. The number of carbon atoms of the higher fatty acid soap is from 9 to 25, preferably 11 to 20. If the number of carbon atoms is too small, the effect of improving the blocking resistance tends to lower, and if the number of carbon atoms is too large, the impact resistance tends to lower.

The amount of the higher fatty acid soap is from 0.1 to 10 parts by weight per 100 parts by weight of the graft copolymer from the viewpoint of balance of impact resistance and blocking resistance. If the amount of the higher fatty acid soap is too small, the effect of improving the blocking resistance tends to lower. If the amount is too large, the impact resistance tends to lower.

If a metal salt such as magnesium or calcium is used as a coagulating agent for coagulating the latex of the graft copolymer and a higher fatty acid alkali metal salt is used as a higher fatty acid soap, the higher fatty acid alkali metal salt converts into magnesium or calcium salt of a higher fatty acid. These magnesium and calcium salts have a higher melting point and exhibits a better blocking resistance. Accordingly, an enhanced blocking resistance-improving effect is obtained when a latex of the graft copolymer is coagulated with an alkaline earth metal salt such as calcium chloride or magnesium sulfate and is diluted with water to a solid concentration of 1 to 20% by weight and thereto is added at least one of the crosslinked polymer and the silicone oil, followed by recovery of a resin powder from the resulting mixture, or when a latex of the graft copolymer is coagulated with an alkaline earth metal salt to form a slurry having a solid concentration of about 5 to about 40% by weight, the crosslinked polymer is then added to the slurry and a 1 to 20% by weight aqueous solution of a higher fatty acid soap is subsequently added thereto, followed by recovery of a resin powder from the resulting mixture.

Silicone oils used in the present invention are an organosiloxane compound having siloxane bonds, e.g., octamethylcyclotetrasiloxane or decamethylcyclopentasiloxane, and a polyorganosiloxane, e.g., polydimethylsiloxane or polyphenylmethylsiloxane. These may have a substituent in the side chains. Known silicone oils can be used in the present invention.

The amount of the silicone oil is from 0.001 to 5 parts by weight, preferably 0.01 to 1 part by weight, per 100 parts by weight of the graft copolymer from the viewpoint of balance of impact resistance and blocking resistance. If the amount of the silicone oil is too small, the effect of improving the blocking resistance tends to lower. If the amount is too large, the cost rises.

Preferably, the silicone oil is added to the graft copolymer in a manner such that after adding the crosslinked polymer or the higher fatty acid soap to a slurry having a solid concentration of about 5 to about 40% by weight formed by coagulating a latex of the graft copolymer, the slurry is dehydrated to a solid concentration of about 50 to about 99.9% by weight and the silicone oil is then mixed therewith. The dropwise addition or spraying of the silicone oil to the dehydrated mixture is preferable since a higher blocking resistance-improving effect is obtained.

The graft copolymer is incorporated with two or three additives selected from the group consisting of the crosslinked polymer, the higher fatty acid soap and the silicone oil. Each of the graft copolymer and the crosslinked polymer may be used in the form of any of latex, slurry and dried resin powder. At least two additives may be added simultaneously or separately and may be added in a different order.

The thus obtained mixture of the graft copolymer with at least two additives is useful as an impact modifier for thermoplastic resins. The impact modifier of the present invention can be incorporated into various thermoplastic resins in order to improve the impact resistance thereof. Examples of the thermoplastic resin are, for instance, vinyl chloride homopolymer and copolymers, chlorinated polyvinyl chloride, polystyrene, styrene-acrylonitrile copolymer, styrene-acrylonitrile-N-phenylmaleimide copolymer, α-methylstyreneacrylonitrile copolymer, polymethyl methacrylate, methyl methacrylatestyrene copolymer, polycarbonate, polyamide, a polyester such as polyethylene terephthalate or polybutylene phthalate, polyphenylene ether, and the like. These may be used alone or in admixture thereof.

The ratio of the thermoplastic resin to the impact modifier incorporated therein is from 5:95 to 99:1 by weight, preferably from 10:90 to 97:3 by weight, from the viewpoints of good impact resistance and rigidity of molded articles. The incorporation of the impact modifier can be conducted for example by mixing them in Henschel mixer or ribbon blender and then mixing the resulting mixture in roll mill, extruder or kneader.

At the time of mixing, there can be added usual additives such as plasticizer, stabilizer, lubricant, ultraviolet absorber, antioxidant, flame retardant, pigment, glass fiber, filler, high molecular weight processing aid, high molecular weight lubricant, and the like. The obtained thermoplastic resin composition can be molded by usual molding methods applicable to thermoplastic resins, e.g., injection molding, extrusion, blow molding and calendering.

The present invention is more specifically described and explained by means of examples wherein all parts and % are by weight unless otherwise noted. It is to be understood that the present invention is not limited to these examples.

In the following Examples and Comparative Examples, evaluation was made in the following manner.

Blocking Resistance

A cylindrical vessel having a diameter of 50 mm was charged with 30 g of a powder of an impact modifier (composition comprising a graft copolymer and additives), and a load of 1 kg/cm² was applied to the powder at 40° C. for 3 hours to form a block. The block was vibrated at 60 Hz for 100 seconds by a Powder Tester PEE made by Hosokawa Micron Kabushiki Kaisha to break the block. The weight proportion of the powder which passed through a 18 mesh sieve based on the whole powder used was obtained. The result is shown in Table 1. The larger the value, the higher the blocking resistance.

Izod Impact Strength

Notched Izod impact strength was measured at 23° C. according to JIS K-7110 using a notched ¼ inch bar.

The thermoplastic resin used in the Examples is a polyvinyl chloride (trade mark "Kanevinyl S-400", made by Kaneka Corporation) incorporated with, per 100 parts of polyvinyl chloride, 3.0 parts of a tin stabilizer (trade mark "TVS 8831", made by Nitto Kasei Kabushiki Kaisha), 0.5 part of a lubricant (trade mark "Hoechst Wax E", made by Hoechst) and 1 part of a high molecular weight processing aid (trade mark "Kaneace PA-20", made by Kaneka Corporation).

Also, molding of a thermoplastic resin composition comprising the above-mentioned thermoplastic resin and an impact modifier (graft copolymer composition) was conducted by a method wherein the thermoplastic resin composition was melt-kneaded at 155° C. by a single screw extruder (VS 50 mm extruder made by Tanabe Plastics Kikai Kabushiki Kaisha) to give pellets and the pellets were molded by an injection molding machine (Model IS-170G made by Toshiba Machine Co., Ltd.) at a cylinder temperature of 175° C. to give specimens for Izod impact test.

EXAMPLE 1

[Preparation of Graft Copolymer Having Hollow Rubber Component]

(1) Preparation of Rubber Latex for Seed Part of Rubber Component

A polymerization reactor was charged with 200 parts of water, 3.5 parts of sodium oleate, 0.4 part of potassium tertiary phosphate, 0.2 part of sodium β-naphthalene sulfonate formaldehyde condensate, 0.005 part of disodium ethylenediaminetetraacetate, 0.002 part of ferrous sulfate (FeSO$_4$.7H$_2$O), 10 parts of t-dodecylmercaptan, 25 parts of styrene and 75 parts of butadiene. After elevating the temperature to 50° C., 0.1 part of paramenthane hydroperoxide and 0.1 part of sodium formaldehyde sulfoxylate were added to the reactor and the polymerization was carried out for 15 hours to give a rubber latex (R-1) having an average particle size of 0.06 μm.

(2) Preparation of Graft Copolymer Having Hollow Rubber Component

A polymerization reactor was charged with 10 parts (solid matter) of the rubber latex (R-1) and 70 parts of water, and thereto was then added a dispersion formed by a homogenizer from a mixture of 75 parts of butyl acrylate, 7.5 parts of allyl methacrylate, 19 parts of toluene, 0.75 part (solid matter) of a 5% aqueous solution of sodium lauryl sulfate and 400 parts of water. The resulting mixture was stirred at room temperature for 2 hours. To the reactor were then added 0.002 part of ferrous sulfate (FeSO$_4$.7H$_2$O), 0.005 part of disodium ethylenediaminetetraacetate, 0.2 part of sodium formaldehyde sulfoxylate and 1 part of paramenthane hydroperoxide, and the polymerization was carried out at 40° C. for 2 hours.

After elevating the temperature to 45° C., 0.15 part (solid matter) of a 5% aqueous solution of sodium lauryl sulfate, 0.0016 part of ferrous sulfate (FeSO$_4$.7H$_2$O), 0.004 part of disodium ethylenediaminetetraacetate and 0.2 part of sodium formaldehyde sulfoxylate were added to the reactor. Subsequently a mixture of 13.2 parts of methyl methacrylate, 1.8 parts of butyl methacrylate and 0.012 part of cumene hydroperoxide was continuously added to the reactor over 1 hour. The polymerization was further continued for 1 hour to give a latex (G-1) of a graft copolymer having a hollow core and having an average particle size of 0.13 μm.

The latex (G-1) was hardened by an epoxy resin, stained by ruthenium tetraoxide and observed by transmission electron microscopy (TEM), whereby presence of cavity was confirmed. Also, the percentage of cavity was determined from the particle size of a rubber latex measured by Microtrac UPA and the light scattering intensity of the same latex. The cavity percentage of the rubber particle was 45% by volume.

[Preparation of Crosslinked Polymer (L-1)]

A polymerization reactor equipped with a stirrer was charged with 200 parts of water, 0.5 part of sodium oleate, 0.002 part of ferrous sulfate (FeSO$_4$.7H$_2$O), 0.005 part of disodium ethylenediaminetetraacetate and 0.2 part of sodium formaldehyde sulfoxylate. After elevating the temperature to 70° C., a mixture of 80 parts of methyl methacrylate, 10 parts of styrene, 10 parts of 1,3-butylene glycol dimethacrylate and 0.3 part of cumene hydroperoxide was then continuously added over 7 hours. During this period, 0.5 part portions of sodium oleate were added 2 hours, 4 hours and 6 hours after starting the polymerization. After the completion of the addition of the monomer mixture, stirring was continued for 2 hours to complete the polymerization and to give a polymer latex (L-1). The polymerization conversion was 99%.

[Preparation of Impact Modifier]

To 100 parts (solid matter) of the latex (G-1) of hollow graft copolymer particles was added 80 parts of a 5% aqueous solution of calcium chloride to coagulate the latex, and thereto was further added 300 parts of pure water to give a slurry of coagulated particles having an average particle size of 200 μm. The temperature of the slurry was elevated to 30 to 50° C. with stirring, and thereto was added 1.5 parts of potassium palmitate. After elevating the temperature to 40 to 60° C., 0.75 part (solid matter) of the crosslinked polymer latex (L-1) was added to the slurry. The resulting mixture was heat-treated at 95° C. for 5 minutes, dehydrated and dried to give a powder of impact modifier having an average particle size of 100 μm.

The blocking resistance of the obtained impact modifier and the Izod impact strength of a molded article of a thermoplastic resin incorporated with the impact modifier are shown in Table 1.

EXAMPLE 2

To 100 parts (solid matter) of the hollow graft copolymer latex (G-1) was added 80 parts of a 5% aqueous solution of calcium chloride to coagulate the latex, and thereto was further added 300 parts of pure water to give a slurry of coagulated particles having an average particle size of 200 μm. The temperature of the slurry was elevated to 30 to 50° C. with stirring, and thereto was added 0.75 part (solid matter) of the crosslinked polymer latex (L-1). After elevating the temperature to 40 to 60° C., 1.5 parts of potassium palmitate was added to the slurry. The resulting mixture was heat-treated at 95° C. for 5 minutes, dehydrated and dried to give a powder of impact modifier having an average particle size of 100 μm. The results are shown in Table 1.

EXAMPLE 3

An impact modifier powder was prepared in the same manner as in Example 1 except that in the preparation of impact modifier, the latex of the crosslinked polymer (L-1) was used in an amount of 1.5 parts on dry basis. The results are shown in Table 1.

EXAMPLE 4

To 100 parts (solid matter) of the hollow graft copolymer latex (G-1) was added 80 parts of a 5% aqueous solution of calcium chloride to coagulate the latex, and thereto was further added 300 parts of pure water to give a slurry of coagulated particles having an average particle size of 200 μm. The temperature of the slurry was elevated to 30 to 50° C. with stirring, and thereto was added 1.5 parts of potassium palmitate. The resulting mixture was heat-treated at 95° C. for 5 minutes and dehydrated to a solid content of about 50–95%. To this dehydrated mixture was sprayed 0.15 part of a silicone oil, and the mixture was dried to give a powder of impact modifier having an average particle size of 100 μm. The results are shown in Table 1.

EXAMPLE 5

An impact modifier powder was prepared in the same manner as in Example 4 except that 0.75 part (solid matter) of the latex of the crosslinked polymer (L-1) was added instead of potassium palmitate. The results are shown in Table 1.

Comparative Example 1

Evaluation was made in the same manner as in Example 1 except that potassium palmitate and crosslinked polymer (L-1) were not added to the hollow graft copolymer. The results are shown in Table 1.

Comparative Example 2

A latex of non-hollow (solid) graft copolymer (G-2) was prepared in the same manner as in Example 1 except that in the preparation of graft copolymer, a polymerization reactor was charged with 70 parts of water, 0.75 part (solid matter) of a 5% aqueous solution of sodium lauryl sulfate, 0.002 part of ferrous sulfate ($FeSO_4 \cdot 7H_2O$), 0.005 part of disodium ethylenediaminetetraacetate and 0.2 part of sodium formaldehyde sulfoxylate, and thereto were continuously added 85 parts of butyl acrylate, 7.5 parts of allyl methacrylate and 1 part of paramenthane hydroperoxide at 40° C. over 5 hours to produce a rubber, and the graft polymerization of a monomer mixture of methyl methacrylate and butyl methacrylate was then carried out. It was confirmed by TEM observation of the thus obtained latex (G-2) that the graft copolymer (G-2) was non-hollow (solid) particles.

A powder of impact modifier was prepared in the same manner as in Example 1 except that the non-hollow graft copolymer latex (G-2) was used. The results are shown in Table 1.

Comparative Example 3

An impact modifier powder was prepared in the same manner as in Example 1 except that the latex of the crosslinked polymer (L-1) was not added to the graft copolymer. The results are shown in Table 1.

Comparative Example 4

An impact modifier powder was prepared in the same manner as in Example 1 except that potassium palmitate was not added to the graft copolymer. The results are shown in Table 1.

Comparative Example 5

An impact modifier powder was prepared in the same manner as in Example 1 except that only potassium palmitate was added to the graft copolymer in an amount of 3 parts without adding the latex of the crosslinked polymer (L-1). The results are shown in Table 1.

Comparative Example 6

An impact modifier powder was prepared in the same manner as in Example 1 except that only the latex of the crosslinked polymer (L-1) was added to the graft copolymer in an amount of 3 parts on dry basis without adding potassium palmitate. The results are shown in Table 1.

From Table 1, it would be understood that the impact modifier of the present invention comprising a hollow graft copolymer and at least two specific additives has well-balanced powder characteristics and impact resistance-improving effect.

TABLE 1

| | Impact modifier | | | | | Blocking resistance | Izod impact strength |
|---|---|---|---|---|---|---|---|
| | Hollow graft copolymer | | Potassium palmitate | Crosslinked polymer | Silicone oil | | |
| | (Kind) | (part) | (part) | (part) | (part) | (breaking ratio %) | (kg · cm/cm) |
| Example 1 | G-1 | 100 | 1.5 | 0.75 | 0 | 80 | 45 |
| Example 2 | G-1 | 100 | 1.5 | 0.75 | 0 | 70 | 45 |
| Example 3 | G-1 | 100 | 1.5 | 1.5 | 0 | 90 | 35 |
| Example 4 | G-1 | 100 | 1.5 | 0 | 0.15 | 95 | 55 |
| Example 5 | G-1 | 100 | 0 | 0.75 | 0.15 | 95 | 55 |

TABLE 1-continued

|  | Impact modifier | | | | Blocking resistance | Izod impact strength |
|---|---|---|---|---|---|---|
|  | Hollow graft copolymer | Potassium palmitate | Crosslinked polymer | Silicone oil | | |
|  | (Kind) (part) | (part) | (part) | (part) | (breaking ratio %) | (kg · cm/cm) |
| Com. Ex. 1 | G-1  100 | 0 | 0 | 0 | 0 | 50 |
| Com. Ex. 2 | G-2  100 | 1.5 | 0.75 | 0 | 80 | 15 |
| Com. Ex. 3 | G-1  100 | 1.5 | 0 | 0 | 20 | 45 |
| Com. Ex. 4 | G-1  100 | 0 | 1.5 | 0 | 30 | 35 |
| Com. Ex. 5 | G-1  100 | 3.0 | 0 | 0 | 30 | 35 |
| Com. Ex. 6 | G-1  100 | 0 | 3.0 | 0 | 40 | 25 |

What we claim is:

1. An impact modifier having an improved blocking resistance which comprises (A) a graft copolymer prepared by polymerization of a vinyl monomer in the presence of hollow rubber particles, and at least two additives selected from the group consisting of (B) 0.1 to 10 parts of a higher fatty acid soap, (C) 0.1 to 10 parts of a crosslinked polymer of 0.1 to 100% by weight of a crosslinking monomer and 0 to 99.9% by weight of a vinyl monomer and (D) 0.001 to 5 parts of a silicone oil, said parts of (B), (C) and (D) being parts by weight per 100 parts by weight of said graft copolymer (A).

2. The impact modifier of claim 1, wherein said higher fatty acid soap is an anionic surface active agent of a carboxylic acid having a $C_7$ to $C_{25}$ alkyl group.

3. The impact modifier of claim 1, wherein said higher fatty acid soap is an anionic surface active agent of a carboxylic acid having a $C_{10}$ to $C_{20}$ alkyl group.

* * * * *